United States Patent [19]
Day

[11] Patent Number: 5,589,243
[45] Date of Patent: Dec. 31, 1996

[54] REINFORCED FOAM CORES AND METHOD AND APPARATUS OF PRODUCTION

[75] Inventor: Stephen W. Day, Dayton, Ohio

[73] Assignee: Webcore Technologies, Inc., Centerville, Ohio

[21] Appl. No.: 503,205

[22] Filed: Jul. 17, 1995

Related U.S. Application Data

[63] Continuation-in-part of Ser. No. 102,892, Aug. 6, 1993, Pat. No. 5,462,623, which is a continuation-in-part of Ser. No. 877,985, May 4, 1992, abandoned.

[51] Int. Cl.⁶ .................................. B32B 3/10; B32B 3/18
[52] U.S. Cl. ............................................ 428/56; 428/316.6
[58] Field of Search ................................. 428/54, 53, 61, 428/56, 119, 223, 316.6; 52/782.1, 790.1, 794.1

[56] References Cited

U.S. PATENT DOCUMENTS

| | | | |
|---|---|---|---|
| 2,062,590 | 12/1936 | Lundquist | 156/264 X |
| 2,493,032 | 1/1950 | Rheinfrank, Jr. | 156/278 X |
| 3,230,995 | 1/1966 | Shannon | 156/250 X |
| 3,243,492 | 3/1966 | Voelker | 156/79 X |
| 3,264,153 | 8/1966 | Rodman | 156/79 |
| 3,544,417 | 12/1970 | Corzine | 428/316.6 |
| 3,549,449 | 12/1970 | Windecker | 156/254 |
| 3,697,633 | 10/1972 | Edgar | 428/317.5 X |
| 3,708,385 | 1/1973 | Immethun | 428/119 |
| 3,733,235 | 5/1973 | De Ligt | 156/269 X |
| 3,867,238 | 2/1975 | Johannsen | 156/258 X |
| 4,042,746 | 8/1977 | Hofer | 428/354.4 |
| 4,093,762 | 6/1978 | Kiefer | 156/250 X |
| 4,261,613 | 11/1982 | Bogner et al. | 428/119 |
| 4,292,369 | 9/1981 | Ohashi et al. | 428/317.5 |
| 5,192,598 | 3/1993 | Forte et al. | 428/71 |

FOREIGN PATENT DOCUMENTS

| | | | |
|---|---|---|---|
| 0548027 | 9/1942 | United Kingdom | 156/250 |
| 0559527 | 2/1944 | United Kingdom | 156/264 |

Primary Examiner—Alexander Thomas
Attorney, Agent, or Firm—Jacox, Meckstroth & Jenkins

[57] ABSTRACT

Rigid foam boards and alternating absorptive fibrous web sheets are adhered to form core panels or billets. Porosity is maintained in the webs for forming integral structural ties by absorbing resin applied to overlying sandwich panel skins. Beveled foam recesses adjacent web edge portions form structural resin fillets, and protruding edge portions form expanded connections to the skins. Core panels oriented with their webs crossing are layered with web sheets to form enhanced panels. Boards or core panels and web sheets arranged in inclined stacks form second core panels having webs intersecting panel edges or faces at acute angles. Boards of alternating different physical properties and web sheets are bonded to form reinforced panels having differing interior and exterior densities. Compressible foam panels are used in place of or with web sheets to make bendable core panels. Foam between web edge portions is recessed for bonding a settable material to the edge portions.

24 Claims, 7 Drawing Sheets

REINFORCED FOAM CORES AND METHOD AND APPARATUS OF PRODUCTION

RELATED APPLICATION

This application is a continuation-in-part of application Ser. No. 08/102,892, filed Aug. 6, 1993, U.S. Pat. No. 5,462,623, which is a continuation-in-part of application Ser. No. 07/877,985, filed May 4, 1992, abandoned.

BACKGROUND OF THE INVENTION

Sandwich panels are used in a wide variety of applications requiring structural and/or thermal insulation properties. These applications include structural and non-structural uses in refrigerated and non-refrigerated buildings, boats, aircraft, rapid transit and recreational vehicles, enclosed trailers and many others. Structural sandwich panels are composite structures formed by bonding two generally thin facings or skins to a relatively thick core material. The skins, which are normally dense and strong, resist compression and tension, while the core, which is normally of relatively weak and low density material, serves to separate the skins, stabilize them against buckling and resist shear loads.

Two common materials used as cores for sandwich panels are rigid expanded plastic foams and honeycomb materials. Honeycomb core usually comprises a thin sheet material, such as paper or aluminum foil, which is formed into a variety of cellular configurations. Expanded plastic foam cores usually provide much higher levels of thermal insulation than honeycomb, but honeycomb cores are normally substantially stronger than insulating foam cores of comparable density.

Various methods of introducing insulating foams into the cells of honeycomb have been used for the purpose of filling the voids or adding higher levels of thermal insulation to structurally adequate honeycomb core. These include such approaches as applying foaming chemicals to the honeycomb cells, and pressing slabs of plastic foam into the cells. However, these processes are difficult to perform in thick core sections, limit the types of foams which can be used to fill the cells of the honeycomb uniformly, or require large capital investment in machinery. As a result, such composite cores have enjoyed little use in most sandwich panel applications, and many honeycomb core products are consequently deficient in insulation and subject to migration of water into the core.

Sandwich panels with skins of metal, wood, fiberglass reinforced plastics and similar durable materials are widely manufactured by three basic processes. In one process, liquid chemicals, commonly of polyisocyanurate formulation, are injected between the skins, after which they react and expand to form a rigid foam which bonds itself to the skins to form the sandwich panel. A second method of producing sandwich panels is by adhesive lamination wherein preformed panel skins are bonded by adhesive to cores of rigid foam boards or slabs which have been cut from expanded foam billets. In the third method, uncured resins and reinforcing materials are applied to the surfaces of such foam boards, or resins are introduced and into closed or vacuum bagged molds containing the core and skin reinforcements and subsequently cured to form rigid skins.

Sandwich panel laminators use a wide variety of these preformed cores, including polyurethane, polyisocyanurate, extruded polystyrene, expanded polystyrene, polyvinylchloride and foam glass. The use of common low density (2.0 pounds per cubic foot) polyurethane and polyisocyanurate foams in structural lamination processes is severely restricted in spite of large demand for sandwich panels containing such cores. The cost of such core materials in the form of boards or slabs cut from billets is substantially higher than the cost of chemicals used in foam-in-place processes, a differential of typically two to three times. In addition, since most polyurethane and polyisocyanurate billet stock is manufactured for applications other than sandwich panels, the stock is not usually formulated with physical properties designed primarily for structural sandwich panel use. The best foam stocks having appropriate properties for such sandwich panels are produced by very few suppliers and in limited geographic areas.

Polyisocyanurate foam is also produced as board stock with attached facings for use as insulation in roofs and other non-structural construction applications. This foam material satisfies common fire performance specifications, is manufactured in large quantities in numerous locations, and is sold as a relatively low priced commodity. In spite of its compelling cost advantages and the modest structural requirements of most construction panel cores, such insulation has seen very limited use as core material for sandwich panels. Both thickness and flatness of the roof insulation boards have unacceptably wide tolerances for most sandwich panel applications. While planing or sanding the facings eliminates this problem, it also removes the skin part of the foam board having the highest density and strength. Even more serious, available polyisocyanurate foam formulations are not consistently tough enough, and their friability, brittleness and low shear strength can result in serious structural failures. These show up as delamination or foam shear under conditions of structural loading, thermal stress or surface impact.

Plastic foam cores for more structurally demanding sandwich panel applications, such as the hulls of boats, are commonly made of linear or cross-linked polyvinyl chloride (PVC) formulations, in densities of from 2 to 16 pounds per cubic foot. The high cost of these materials per board foot has limited their use in such major medium to high performance applications as highway trailers and recreational vehicles. A further drawback of the PVC foams and of other thermoplastic foams, such as polystyrene, is serious degradation of their physical properties at elevated temperatures encountered in many transportation and other environments.

Plastic foam core sandwich panels often involve serious compromises in their design and cost due to inherent structural limitations of the rigid foam insulation cores. In addition to the deflection of these panels due to compressive and tensile stresses in the skins, further deflection results from the relatively low shear modulus of the rigid foam material. The thicker the core, the more important shear deflection becomes, to the point of exceeding deflection due to bending. Under a sustained load, the plastic foam core is also subject to creep deformation, further increasing panel deflection, with resulting risk of failure of the sandwich panel.

These deficiencies of the core may require increasing the strength and stiffness of the composite through the use of excessively heavy and expensive skins. Alternately, the panel could be improved structurally by increasing the thickness or density of the foam core beyond acceptable limits, which also raises the costs of both material and shipping. The relatively low shear modulus of low density plastic foam cores also allows buckling of thin flat panel skins to occur at relatively low stress levels, again calling for overdesign of skins or higher density foam cores as a compensation. Low shear resistance and the absence of reinforcing elements within the foam core also permit the propagation under stress of cracks or fissures between the core and the panel skins as well as within or through the core itself, with resulting deterioration or structural failure of the panel. Still another difficulty is the low compressive strength of most plastic foams, which allows concentrated or impact loads to distort both skins and core.

Reinforcing frames or ribs of metal, wood, fiberglass reinforced plastic and other materials have been used in foam core sandwich panels to mitigate or overcome the structural limitations described above. Although both foam core and ribs contribute to the strength of these panels, the structural contribution of the ribs in such constructions is not fundamentally dependent upon the presence of the foam core.

An often serious drawback of widely spaced ribs is the creation of overly rigid sections of the structure within a generally more flexible panel. This can result in undesirable concentrated loads at the intersection of ribs and face laminates, especially with thinner face laminates made with higher strength composite materials. Structural properties of the composite may be improved by assembling between the skins a large number of individual blocks or strips of foam wrapped with fibrous reinforcing materials which connect the skins and fill the space between them. Impregnating resins are applied to both skin and core reinforcements during this layup process. Alternately, all components of skin and core reinforcement and foam may be positioned in a mold while in a dry and porous state, after which the mold is closed and resin is introduced under pressure, as in vacuum-assisted resin transfer molding, to flow into and impregnate the reinforcements. In either case, the process of preparing and inserting the individual foam and reinforcement components of the core is both labor intensive and expensive.

SUMMARY OF THE INVENTION

The present invention is directed to an improved reinforced composite foam core panel and to methods and apparatus for producing the same, and as one important advantage, provides for significantly reducing the cost of producing foam core sandwich panels or walls having superior structural and thermal insulation properties. As another advantage, the invention provides for producing a reinforced foam core panel which has optimum structural and thermal insulation characteristics without sacrificing one for the other. A reinforced foam panel or billet constructed in accordance with the invention also has uses other than as a core for sandwich panels, such as in the fabrication of pipe insulation and in blocks which may be machined to a particular shape.

In one embodiment of the invention, the above features and advantages are provided by stacking rigid foam insulation boards and thin flexible fibrous sheets in alternating layers with adhesive between the layers, and then compressing the stack while the adhesive cures to form a core panel or billet. The billet is cut through the alternate layers and along parallel spaced planes to form reinforced foam core panels each having spaced webs formed by strips of the fibrous sheets.

The present invention employs inexpensive, low labor methods to produce large, unitized foam core panels having integral, generally closely spaced structural reinforcing webs whose edge portions are exposed at the faces of the core panels to provide for bonding the edge portions of the webs along with the foam strips between the webs, to sandwich panel skins which are applied to the core. The greater frequency of webs compared to conventional structural rib construction generally permits the use of lighter weight reinforcing materials for both webs and skins. It also provides a larger number of lines of contact for bonding webs to skins. An important feature of the present invention is that these lines of contact may be expanded in area to provide for improved resistance of structural forces which might otherwise lead to premature failure of the bond.

Structural webs or frames comprised of fibrous reinforcement and cured resin must transmit shear loads between the core and the sandwich panel skins along the lines of intersection between the edge portions of the webs and the panel skins. In the case of conventional larger and more widely spaced structural frames, these intersections are often strengthened by adding additional reinforcing fibers and resin to the frame members adjacent to the skins, in order to expand the area of intersection and thus create stronger connections. In the present invention, markedly improved structural bonds are achieved by forming fillets of bonding resin at the intersection of web edges and panel skins. This is accomplished during core manufacture by forming recesses within the foam adjacent the web edge portions to form a 45° bevel or other desired shape, such as rectangular or radiused. When skins are attached, the impregnating resin flows into the recesses, hardens and provides an expanded area of structural connection to both the web edge portions and the panel skins.

Resins used to impregnate sandwich panel skin reinforcements and to bond sandwich panel skins to cores typically exhibit significantly reduced bond strength when adhered to previously cured resins. Thus, even if the skin resin and the previously-cured web resin are of the same initial chemical composition, their line of contact is frequently the weak point in the composite structure. This is especially true if only the thin edges of the webs are in contact with the panel skins and if web edge portion fillets are not used. A feature of the present invention is that the web sheets may be comprised of fibrous, absorptive or porous and unimpregnated reinforcing material which is attached between the foam strips by pressure sensitive adhesive, stitching or other means which maintain the webs in a dry, unimpregnated and substantially porous form. During the process of applying resin to the panel skin reinforcements, the resin flows into and impregnates the webs, including their edge portions which are in contact with the panel skin reinforcements, causing the webs to form integral, structural tie webs between the panel skins. If desired, the selection of relatively bulky and compressible fibrous reinforcements as the web material allows the core to be bent to conform to the shape of a mold.

Structural integration of these porous webs to skins may be enhanced beyond that achieved by simultaneous impregnation of the skins and generally flush porous webs, through expansion of the web edge portions at the area of attachment to the skins. The porous and unimpregnated webs are caused to protrude beyond the surface of the foam, and if desired, these protruding edge portions may be frayed to increase the separation of their fibers. When skin materials are applied to the core and pressure applied for bonding of skins to core, the protruding web fibers are caused to flare out or fold over, substantially increasing their area of contact with the skins as the impregnating resin cures. The features of porous and protruding webs and fillets may be combined if desired in the same core panel.

Beveled foam edges adjacent the web offer the additional advantage that these fillet grooves or recesses in the foam serve as channels to direct the flow of resin along the edges of the porous webs, thus promoting more rapid and thorough impregnation of the webs. In the case of cores with intersecting webs, the lines of intersection of the webs pass through the core, and resin may also travel through the core along the fillet grooves or recesses.

According to the present invention, composite reinforced foam core panels are also stacked with interleaving fibrous sheets and adhesive to form billets which are cut to form rigid foam core panels with reinforcing webs in a grid-like cellular configuration, such as rectangular, diamond or parallelogram shape. The grid-like core panels are stacked in a similar manner to form a billet with the webs extending in X-Y-Z or three different directions, and billets are also formed with composite core panels stacked in a step-like manner and then cut along inclined parallel planes to provide core panels with inclined truss-like webs. In another embodiment, the billets are formed with each reinforced core panel oriented at right angles with respect to adjacent core panels.

The porous web embodiment of the present invention makes it possible to produce, out of any of the billets such as those described above, cores having pre-impregnated webs, without having to cut through billets having hardened resin in the webs. This is accomplished by first making cores having porous webs, according to methods disclosed herein, then flowing impregnating resin into the webs and curing the resin, without attaching skins to the faces of the cores. Fillet grooves or recesses may be included in the foam, in order to produce fillets in the finished core. If desired, the impregnated and cured cores may be machine sanded to remove surface resin and roughen the web edge portions and fillets for subsequent adhesive bonding to the skins.

Billets are also produced in accordance with the invention with high density and low density foam boards in combination with fibrous webs to form reinforced composite panels with high density surface portions and lower density center portions, and reinforced composite core panels are laminated at the top and bottom of a billet after being rotated 90° to form reinforced core panels with additionally reinforced longitudinal edge portions for receiving connecting splines. Resilient foam panels are also used between rigid foam boards for producing flexible composite core panels which may be curved.

According to another embodiment, foam core boards are stacked on an incline with fibrous sheets or strips between the boards and are then cut to form rectangular billets or panels with the parallel spaced reinforcing webs extending diagonally or at a bias for exposure at all edge surfaces of each panel or billet in addition to the parallel faces of the boards or billets.

Other features and advantages of the invention will be apparent from the following description, the accompanying drawings and the appended claims.

DESCRIPTION OF THE PREFERRED EMBODIMENTS

Figure 1:
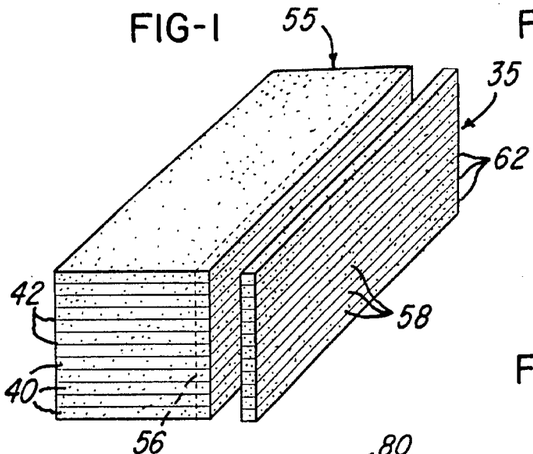
FIG. 1 is a perspective view of a composite foam core billet and a reinforced foam slab or panel constructed in accordance with the invention.

FIG. 1 illustrates a method of producing a composite reinforced foam board or panel 35. Alternating layers of rigid closed cell expanded foam boards 40 and thin sheets 42 of flexible fiberglass or other material are stacked to a height corresponding to the desired width of the panel 35. The boards 40 and sheets 42 receive coatings or layers of adhesive resins and are laminated under pressure in a platen press or under a vacuum bag to form a solid billet 55 of a predetermined size, for example, 4'×4'×8'. The adhesive or resin, such as polyurethane or polyester resin which maintains its strength and stiffness at normal environmental temperatures, is selected to stiffen and/or waterproof and/or fireproof or otherwise modify the sheets 42 and is applied to the foam boards 40 and/or sheets 42 prior to stacking. If applied to the sheets 42, the resin may be in an uncured or partially cured "prepreg" state. After the adhesive cures and the laminating pressure is released, the billet 55 is cut along parallel spaced planes 56 by a large band saw or other suitable cutting means to form a series of the composite reinforced foam boards or panels 35. Thus each panel 35 has a stack of strips 58 formed by sections of the foam boards 40 and parallel spaced webs 62 which are formed by strips of the interposed sheets 42. The panels 35 may vary in thickness, for example, from less than one-half inch to twelve inches or more, depending upon the use of the panels.

Web sheets 42 may comprise porous fibrous material, such as fiberglass mat or cloth, and may be attached to the foam boards 40 in a manner which maintains the porosity of the fibers, as for instance by applying pressure sensitive adhesive to the foam boards 40 and compressing the stack to form a billet 55, so that only the surface of the outer layer of fibers of the web sheets 42 contact the adhesive. Fibrous skin reinforcements may be applied to the faces of the foam panels 35 which are cut from the billet 55 to form sandwich panels in which the resin applied to the skin reinforcements flows into and simultaneously impregnates the porous webs 62, which cure to form structural tie webs between the skins. If it is desired to form a bendable core, the porous webs 62 may comprise bulky and compressible fibrous material, such as polyester or fiberglass, which may be conformed to the desired curvature before application of impregnating resin.

When fibrous sheets 42 are cut by a band saw, the cutting operation frays the longitudinal edges of the webs 62. Thus, when skins are laminated by adhesive or resin to the sides of the panel 35, there may be penetration of the adhesive or resin into the fibers to form positive bonds of the webs 62 to the skins. This fraying action is limited with webs which have been impregnated and cured with adhesive or resin, but is quite extensive for fibrous webs which have been attached to the foam by means which maintain their fibers in a substantially dry and porous state.

Figures 32, 33:
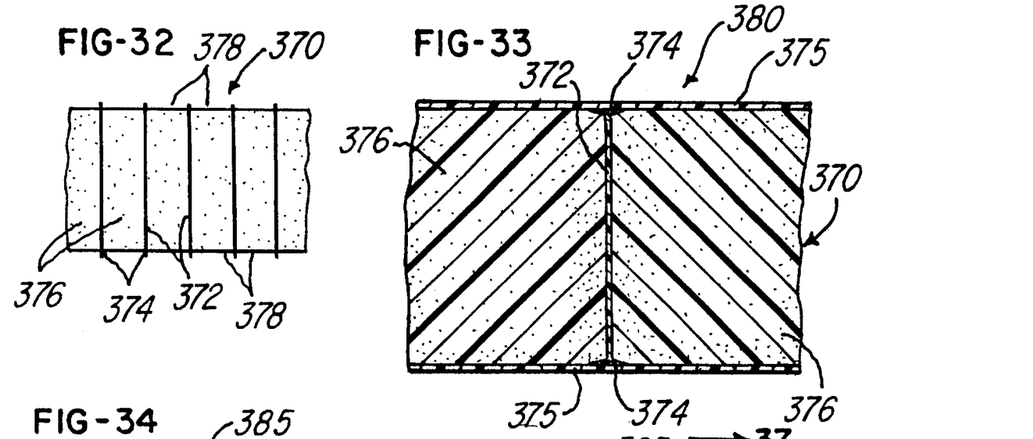
FIG. 32 is a fragmentary edge view of another reinforced foam core panel constructed in accordance with the invention.
FIG. 33 is an enlarged fragmentary section of the core panel shown in FIG. 32.

If desired for greater accuracy in thickness or flatness, the foam panels 35 may be planed, sanded or otherwise abraded on one side or both sides before being laminated to the skins. In the case of panels having porous fibrous webs 62, these processes remove the surface of the foam while leaving the webs to extend beyond the surface of the panel, as discussed later in connection with FIG. 32, for improved adhesion to sandwich panel skins. As the skins are pressed against the protruding fibrous webs, as shown in FIG. 33, the web fibers are caused to flare out or fold over, greatly increasing the area of contact between webs and skins for improved structural bonding as the impregnating resin cures.

When foam is removed from the surface of panels 35 having webs 62 which have been impregnated with resin and cured to become stiff, rather than maintained in a porous and flexible state, the webs are well suited for the application of cementitious materials which cure to form a rigid skin surface surrounding and reinforced by the webs 62.

It is also within the scope of the invention to form a foam board or panel 35 by first laminating flexible sheets 42 of fiberglass or other facer material to one or both sides of a foam board 40 and then feeding the foam boards with attached facet sheets 42 through a gang saw which cuts the laminated boards into the strips 58 and attached webs 62. Core panels having webs oriented in a triangular configuration in cross-section may be formed by cutting the foam boards with saws set at acute angles to cut strips of right-triangle or acute-triangle (such as 60°) cross-section. The strips 58 may then be stacked and the webs 62 bonded together by adhesive to form the composite foam panel 35. For example, commercially available rigid roof insulation boards or panels each consisting of a closed cell polyisocyanurate foam core bonded on each side during the foaming process to fiberglass or reinforced cellulosic felt facer sheets, such as those manufactured by NRG Barriers, Inc. in Saco, Me., may be fed through a gang saw to form foam strips 58 each having facer strips or webs 62 attached to opposite sides. Thus when the strips are stacked to form a panel 35, double webs 62 are sandwiched between each pair of adjacent foam strips 58. If it is desired to produce core panels 35 comprising insulation boards which have been foamed between facet sheets but which have porous, fibrous webs 62, the porous and fibrous web material may be stitched or adhesively attached to the insulation board facet sheets prior to the foaming process. During the foaming process, the facet sheets act as a barrier to the foam chemicals, thus maintaining the porosity of the stitched layer.

Figure 25:
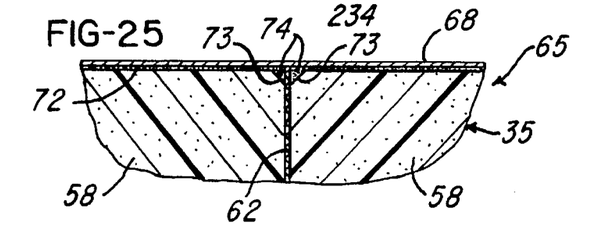
FIG. 25 is an enlarged fragmentary section of a sandwich panel having a reinforced foam core panel constructed in accordance with the invention.

Referring to FIG. 25, a composite foam core sandwich panel 65 is produced with a composite foam core panel 35 laminated to a pair or set of skins 68 which may be fiber reinforced plastic, aluminum, plywood or other suitable facer material. Each skin 68 is attached to the panel 35 by a layer 72 of adhesive or resin. Prior to applying the adhesive or resin layer 72 or impregnating resin to the fibrous skin 68 or to the corresponding side surface of the foam core panel 35, foam may be removed adjacent the edges of the webs 62 by abrasive or cutting tools, for example, to form beveled corners or recesses 73 along one or both sides of the length of each foam strip 58 to expose the longitudinal edge portions of each web 62. Thus when the adhesive or resin layer 72 is applied, the adhesive or resin fills the recesses and forms the fillets 74 and provides a stronger bond between the edge portion of each web 62 and the adjacent skin 68 for increasing the strength and stability of the foam core sandwich panel 65. When the webs 62 comprise porous and fibrous material, this bond is enhanced by the penetration of the adhesive or resin throughout the fibers of the webs so that the webs 62 form connecting tie webs between the skins. The fillet recesses 73 may also be formed in the foam boards by machining grooves within the faces of the foam boards prior to stacking and bonding the boards and web sheets, and then cutting the boards within the grooves with blades thinner than the grooves.

Figure 3:
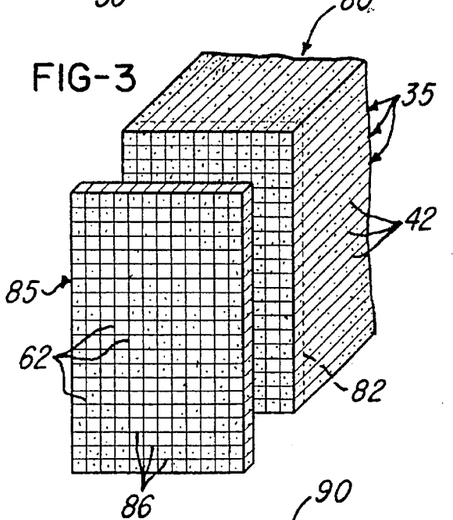
FIG. 3 is a fragmentary perspective view of another reinforced foam core billet and panel also constructed in accordance with the invention.
Figure 4:
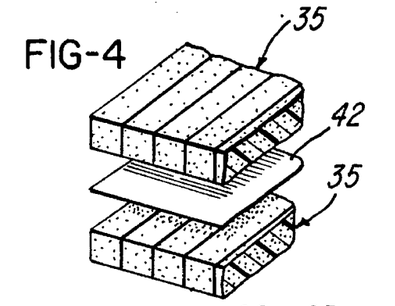
FIG. 4 is an enlarged and exploded perspective view of a corner portion of the billet shown in FIG. 3.

Referring to FIGS. 3 and 4, the composite reinforced foam boards or panels 35, which may be provided with corner recesses 73, and which may have webs perpendicular to the faces or triangulated cross section, are arranged in a stack with a fibrous sheet 42 located between each pair of adjacent panels 35 after adhesive is impregnated into the sheets 42 or applied to the surfaces of the panels 35. The spacing and composition of the sheets 42 may be varied within the stack to achieve different levels of strength at various locations in the stack. This stack of alternating panels 35 and sheets 42 is compressed until the adhesive cures to form a billet 80 which may have the same dimensions as the billet 55. The billet 80 is then cut along parallel spaced planes, one indicated by the dotted lines 82, to form a series of composite rigid foam panels 85 each of which has a grid-like pattern of intersecting continuous strips or webs 86 and interrupted strips or webs 62.

The composite foam panels 85 are ideally suited for use in producing sandwich walls or panels which require high strength in both directions, such as, for example, the cores where resin impregnated fiberglass skins are built up on opposite sides of each panel 85. It is understood that the fillet recesses 73 may be used along the edge portions of all webs 42, 62 and 86 to provide a higher strength bond or connection between each of the webs and between each of the webs 42 and 62 and the overlying sandwich panel skins. These fillet recesses may be formed by machining grooves into the faces of the foam boards 40 and panels 35 prior to their being stacked and bonded as previously described, and the grooves are located along the lines of predetermined billet bandsaw cuts which will yield panels 85. Alternately, the fillet recesses may be formed by machining the faces of the panels 85 after cutting the panels 85 from the billet 80. It is also understood that the spacing as well as the composition of the webs 62 and 42 may differ from each other as required by structural considerations. Core panels 85 may also be produced by cutting panels 35 in a direction perpendicular to the planes of the webs 62 and stacking and bonding the resulting composite strips between alternating layers of web sheets or strips. Before bonding the composite strips and web strips together, the composite strips may be machined to provide resin distribution grooves and/or web fillet recesses.

If it is desired to produce a core panel 85 which may be curved in two directions, for example to produce a reinforced foam core which has a compound curve to form a boat hull, unimpregnated bulky and compressible porous non-woven polyester, fiberglass or other fibrous reinforcing materials may be used to form the sheets 42. The panel may then be deformed to the desired compound curvature during the layup of the boat hull. The resin which is used to form the skins penetrates the porous webs between the foam blocks and then hardens to form the tie webs.

It is also within the scope of the invention to produce a core panel similar to the core panel 85 wherein relatively low density closed or open cell crushable foam sheets or low density thermoformable plastic sheets with a heat softening temperature substantially less than that of the foam boards 40, are used in place of the fibrous sheets 42 to form the crossing or intersecting webs. When the panel is curved, for example to form a boat hull, the webs are crushed or are heat-formed, avoiding the creation of undesirable gaps or voids between the foam blocks formed from the boards 40.

Figures 5, 7:
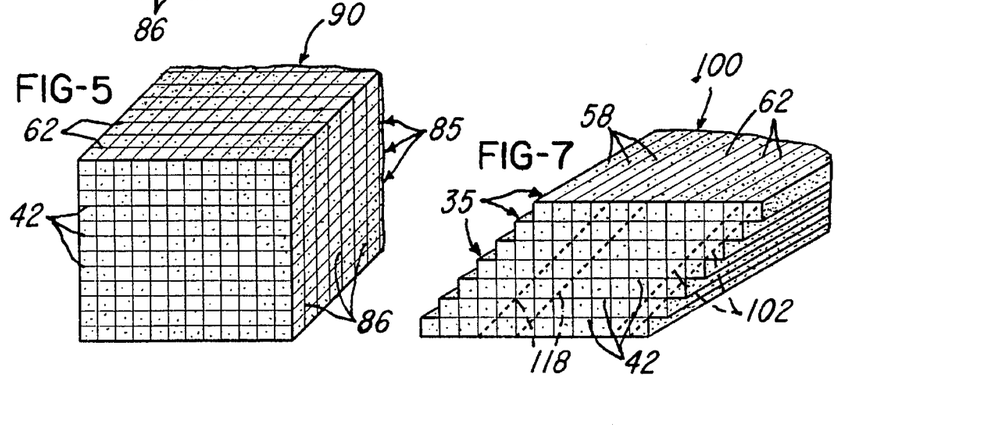
FIG. 5 is a fragmentary perspective view of another reinforced foam core billet constructed in accordance with the invention.
FIG. 7 is a fragmentary perspective view of a stepped reinforced foam core billet constructed in accordance with the invention.
Figure 6:
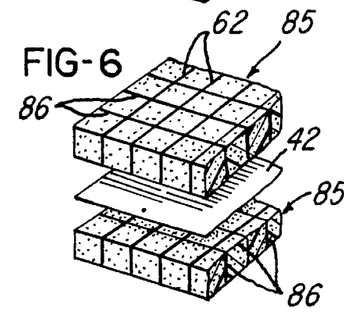
FIG. 6 is an enlarged and exploded perspective view of a corner portion of the billet shown in FIG. 5.

In reference to FIGS. 5 and 6, the composite foam panels 85 each of which may be provided with beveled corner recesses 73 and each having a grid-like arrangement of intersecting webs 62 and 86, are arranged in a stack with interleaving fibrous sheets 42 with adhesive impregnated into the sheets or applied to the side surfaces of the panels 85. Alternately, the fibrous sheets 42 may be attached to the foam panels 85 by pressure sensitive adhesive or other means which maintain the porosity of the web fibers for subsequent impregnation by resin. The stack is compressed to form a large block or billet 90 wherein the webs 42, 62 and 86 extend in X-Y-Z or three different directions. The billet 90 may be used as a reinforced insulated material for fabrication or may be cut into composite foam slabs or panels, and provided with beveled corner recesses 73 on the panel faces if desired, for use in making sandwich panels of enhanced strength. Specialized sheets may be substituted for some of the fibrous sheets 42 to provide specific properties within the composite foam slabs, for example, fire barriers or electromagnetic shielding within slabs used to produce sandwich panel structures.

Figure 8:
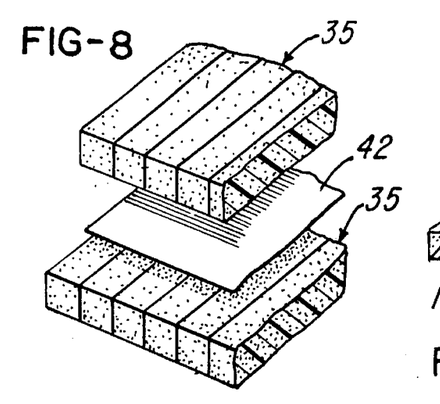
FIG. 8 is an enlarged and exploded perspective view of a corner portion of the billet shown in FIG. 7.

Referring to FIGS. 7 and 8, the composite foam slabs or panels 35 are stacked on an incline in a step-like manner and are adhesively connected or bonded by interleaving fibrous sheets 42 with the stacking angle at 45° or other desired angle. This stack is compressed until the adhesive cures to form a billet 100. When the billet 100 is cut along parallel spaced planes 102 (FIG. 7), which are inclined at 45° with respect to the panels 35, the resulting product is a composite foam panel 110 (FIG. 9) which has longitudinally extending strips or webs 112 formed by the sheets 42 and separating longitudinally extending foam strips 114 formed by the foam boards 40. The foam strips 114 are triangular in cross-sectional configuration, and the webs 112 extend at 45° angles with respect to the side surfaces of the composite foam panel 110.

Figure 9:
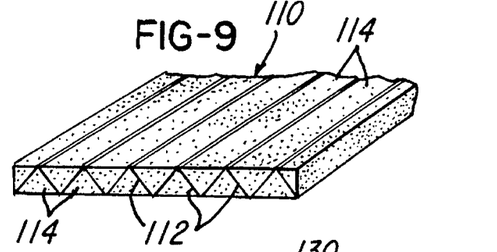
FIG. 9 is a perspective view of an end portion of a reinforced foam core panel cut from the billet shown in FIG. 7.
Figure 10:
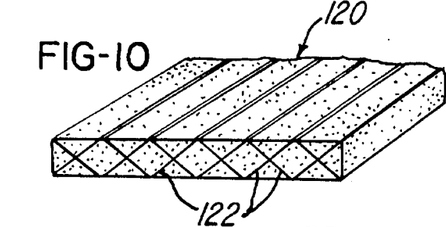
FIG. 10 is a view similar to FIG. 9 and showing another reinforced foam core panel cut from the billet shown in FIG. 7.

As shown in FIG. 9, the opposite longitudinal edges of each web 112 are exposed at the side surfaces or faces of the panel 110. Thus when the composite foam panel 110 is sandwiched between suitable skins to form a sandwich foam core panel, the longitudinal edge portions of the webs 112 are bonded to the skins and form a truss-like arrangement of the webs between the skins to provide a foam core panel with substantial strength and stability in both longitudinal and transverse directions, as desired in many applications. As shown in FIG. 10, when the billets 100 are cut by the band saw along parallel spaced planes 118 (FIG. 7), the resulting product is a composite foam panel 120 having longitudinally extending strips or webs 122 arranged in a crossing or X-shaped pattern. When a composite foam panel 120 is adhesively laminated to skins to form a sandwich foam core panel, longitudinal edge portions of the crossing webs 122 are bonded to the skins in the same manner as described above to form sandwich panels with high resiliency and impact resistance for applications such as boat hulls.

Figure 11:
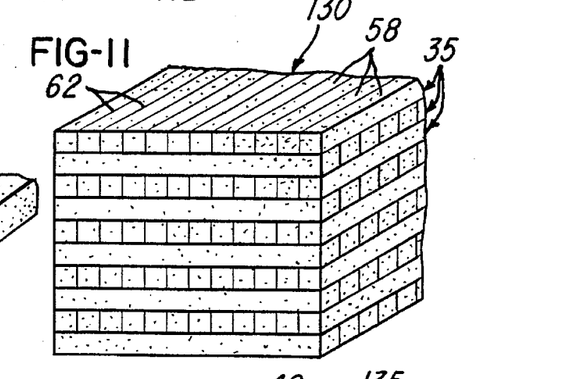
FIG. 11 is a fragmentary perspective view of a modified reinforced foam core billet also constructed in accordance with the invention.
Figure 12:
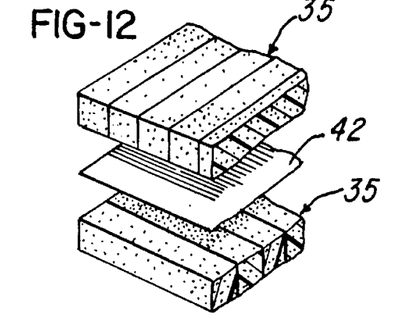
FIG. 12 is an enlarged and exploded perspective view of a corner portion of the billet shown in FIG. 11.

FIG. 11 illustrates another billet 130 constructed in accordance with the invention and wherein composite foam core panels 35 are stacked and adhesively bonded together with the strips or webs 62 in each panel 35 extending perpendicular to the webs 62 of each adjacent panel 35 for the purpose of producing a reinforced foam block or billet which may be cut or fabricated for different applications. If desired, fibrous sheets 42 may be adhesively bonded between the panels 35 to provide increased strength and stability when the billet 130 is cut. The thickness and number of layers of panels 35 and interleaving fibrous sheets 42 may also be selected to produce a reinforced panel 130 of appropriate overall thickness for use as a reinforced core between sandwich panel skins.

Figure 13:
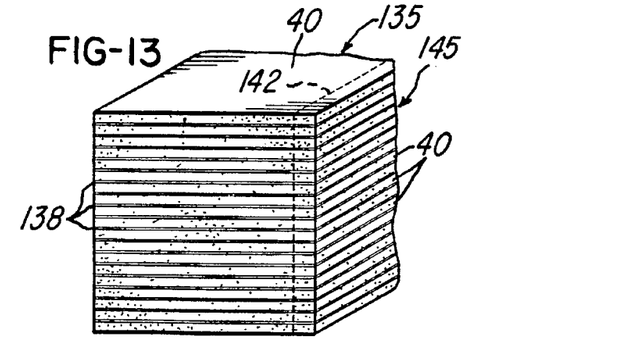
FIG. 13 is a fragmentary perspective view of another embodiment of a reinforced foam core billet constructed in accordance with the invention.
Figure 14:
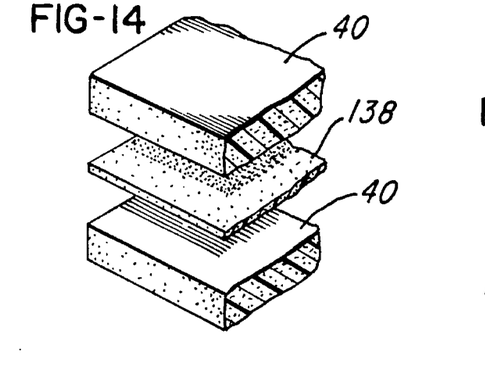
FIG. 14 is an enlarged and exploded perspective view of a corner portion of the billet shown in FIG. 13.
Figure 15:
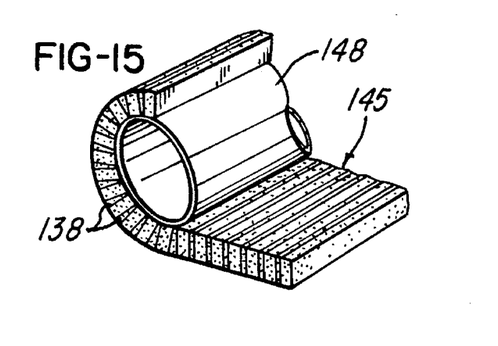
FIG. 15 illustrates a typical use of a flexible panel cut from the billet of FIG. 13.

In reference to FIGS. 13–15, a billet 135 is formed by stacking rigid foam boards 40 and resilient closed or open cell foam panels 138 in an alternating manner and with a layer of adhesive between each interface. The billet 135 is then cut along parallel spaced planes, one shown by the dotted line 142, to form flexible composite foam panels 145. One application of the panels 145 is shown in FIG. 15 wherein a conduit or pipe 148 is wrapped with flexible panels 145 for thermally insulating the pipe and the fluid flowing through the pipe. If desired, fibrous sheets 42 may be interposed between the rigid foam boards 40 and resilient foam panels 138 to provide the panels 145 with increased compression strength in a radial direction. It is also within the scope of the invention to use the prelaminated rigid roof insulation panels with a foam core bonded to fiberglass or other facers, as mentioned above, in place of the foam board 40 and the interposed fibrous sheets 42.

Figures 16, 17, 18, 19, 20, 21, 22:
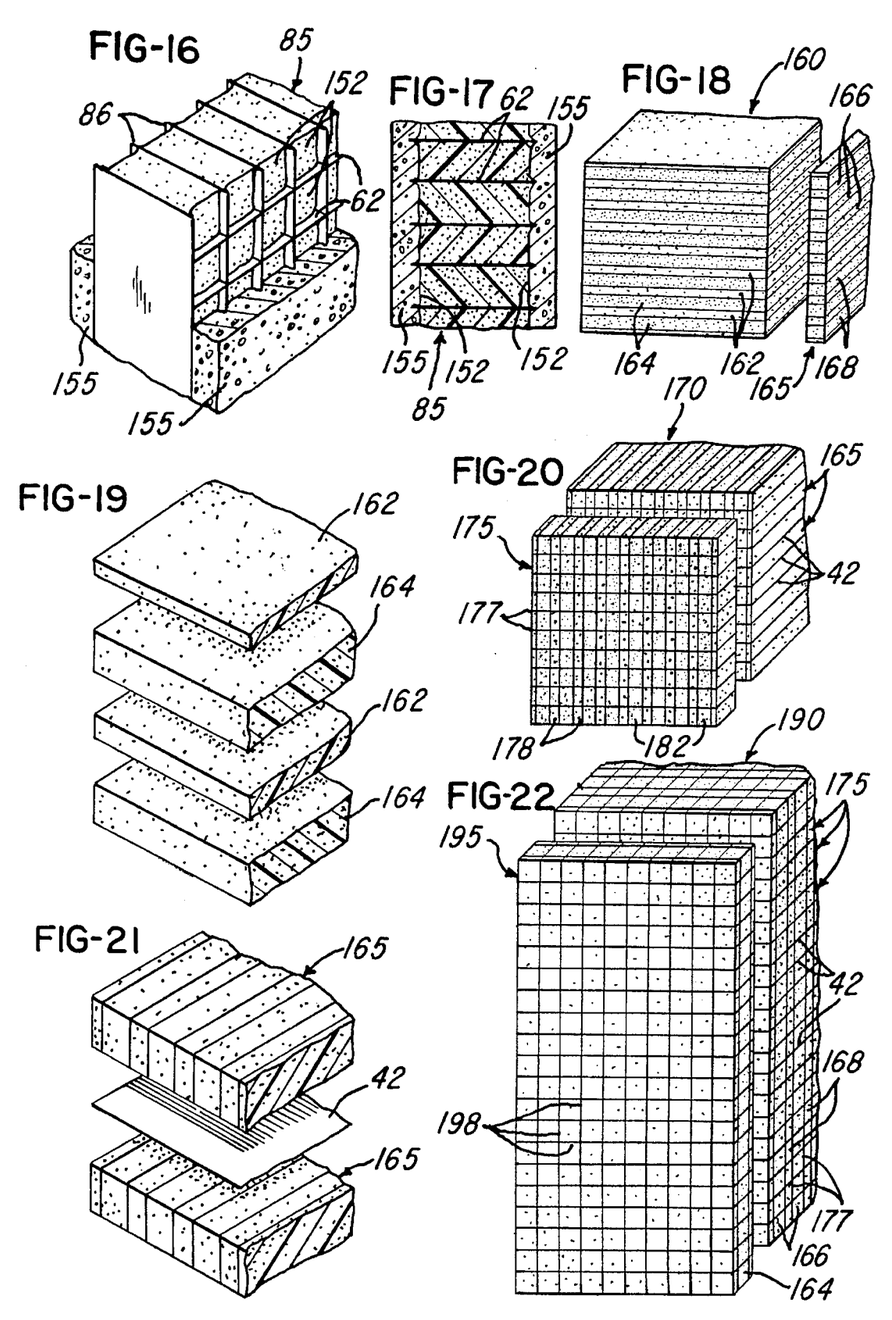
FIG. 16 is a fragmentary perspective view of a load bearing wall having a core formed from the panel shown in FIG. 3.
FIG. 17 is fragmentary section of a portion of the wall shown in FIG. 16.
FIGS. 18–22 are views similar to preceding views and illustrating the steps for producing a variable density and reinforced composite core panel in accordance with the invention.

FIGS. 16 and 17 illustrate one application of a composite foam panel 85 with a grid-like arrangement of intersecting webs 62 and 86 to form a load bearing wall for a building. For such application, the side surfaces or faces of each composite foam panel 85 are exposed to heat or a solvent or abrasion so that the faces of the foam blocks between the webs 62 and 86 shrink to form recesses or cavities 152 between the webs 62. A settable material such as stucco cement 155 or plastic resin is applied to the opposite faces of the panel 85 to provide the panel 85 with resistance to water, fire, etc. in addition to a decorative appearance. The settable material fills the cavities 152 and bonds to the exposed edge portions of the perpendicular webs 62 and 86 to provide a high strength insulated wall assembly which is reinforced by fiberglass webs. As a result of the perpendicular webs 62 and 86 within the composite foam panel 85, the panel is capable of supporting a substantial load and can be used to form a vertical wall of a building without the use of horizontally spaced support columns.

FIGS. 18–22 illustrate the construction of reinforced core panels which vary in foam density through the thickness of the panels. Referring to FIGS. 18 and 19, a composite foam billet 160 is formed by stacking in an alternating manner high density or web reinforced rigid foam boards 162 and low density rigid foam boards 164. The top and bottom high density foam boards 162 have a thickness one-half the thickness of the intermediate high density foam boards 162. The foam boards are adhesively bonded together and compressed, and after the adhesive cures and the compression pressure is released, the billet 160 is cut along parallel spaced planes to form a series of composite foam panels 165 each having alternating strips 166 of high density foam and alternating strips 168 of low density foam. If desired, thin sheets 42 may be inserted between the foam boards 162 and 164 to form web producing strips within the foam panels 165.

Referring to FIG. 20, a series of the composite foam panels 165 are arranged in a stack with interleaving sheets 42 and with layers of adhesive to form a billet 170. The billet 170 is cut along parallel spaced planes to form a series of composite reinforced foam panels 175 which have vertically spaced continuous fibrous strips or webs 177 and horizontally spaced strips 178 of high density foam separated by strips 182 of low density foam.

As shown in to FIG. 22, a series of panels 175 are arranged in a vertical stack with interleaving sheets 42 and adhesive layers to form a billet 190 which is constructed similar to the billet 80 shown in FIG. 3, that is, with vertical webs 177 intersecting horizontal sheets 42. The billet 190 is cut along parallel spaced planes which intersect the center of the high density foam strips 166 to form a series of composite foam panels 195.

Each of the panels 195 has opposite side surfaces formed by the high density foam boards 162 and a center foam core portion formed by the low density foam boards 164. In addition, each of the panels 195 has a X-Y grid pattern of reinforcing webs 198 formed from sections of the fibrous sheets 42. The vertical webs 198 are interrupted and intersect continuous horizontal webs 198. Reinforced composite foam panels 195 are ideally suited for use as a core within the walls for a recreational vehicle or trailer or refrigerated truck body which commonly receive aluminum or fiberglass reinforced plastic skins. The panels 195 provide for high strength and stability with a high density foam surface behind the skins and a low density center core to provide insulation at a cost significantly lower than the cost of producing the composite foam panel entirely of high density foam.

If it is desired to form a reinforced panel having varying foam densities at the surfaces and center of the panel but having only a single set of parallel spaced webs, rather than a grid-like pattern of intersecting webs, the billet 170 shown in FIG. 20 may be cut along parallel spaced planes extending in another direction through the center of the high density foam layers 178 to produce such a panel.

Figures 23, 24:
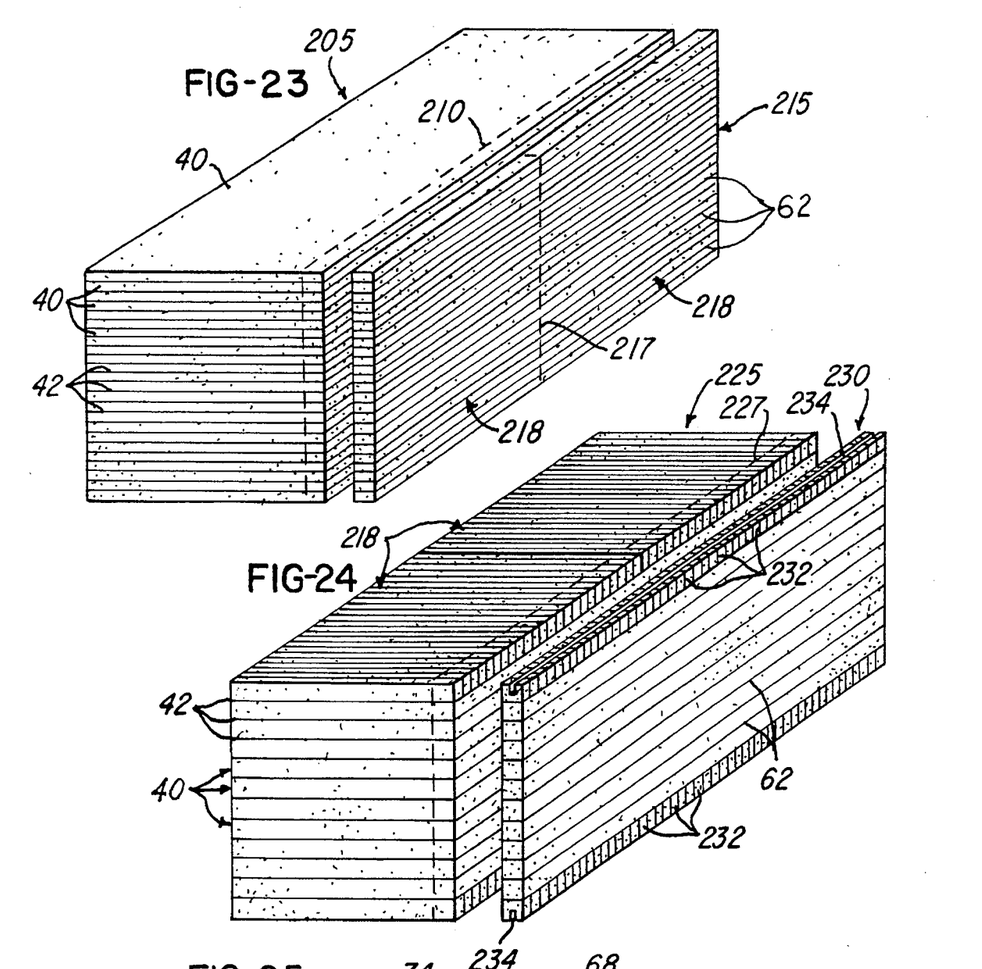
FIGS. 23 & 24 illustrate the steps for producing a reinforced foam core panel with additional reinforced longitudinal edge portions in accordance with the invention.

Referring to FIG. 23, a billet 205 is constructed in the same manner as the billet 55 (FIG. 1) from a stack of rigid foam boards 40 with fibrous sheets 42 positioned between the foam boards 40 and bonded to the boards by layers of adhesive. The billet 205 is cut longitudinally along parallel spaced planes, one indicated by the dotted line 210, to form a series of composite foam panels 215 constructed substantially the same as the panels 35 described above in connection with FIG. 1. Each of the panels 215 is cut in half along a line 217 to form two half panel sections 218.

Referring to FIG. 24, a billet 225 is constructed by stacking a series of foam panels 40 with interspaced fibrous sheets 42 in the same manner as the billet 55 is formed as described above in connection with FIG. 1. However, in the construction of the billet 225, the half panel sections 218 are each rotated 90° and placed as the top and bottom layers of the billet 225 so that the fibrous web strips 62 on the top and bottom layers extend laterally across the width of the billet 225 and are adhesively bonded to the fibrous sheets 42. After the billet 225 is formed, it is cut along parallel spaced planes 227 to form a series of reinforced composite foam panels 230.

Each of the panels 230 is constructed substantially the same as each of the panels 35 with the exception that the longitudinal edge portions of each panel 230 have longitudinally spaced parallel webs 232 which extend laterally across the thickness of the panel 230 and are bonded to the adjacent strips 62 for adding extra reinforcement to the edge portions. A longitudinally extending slot or groove 234 may be formed with each edge portion of each panel 230, and each groove 234 intersects the cross webs 232. The reinforced composite foam panels 230 are ideally suited for use in forming the side walls and ceilings of an insulated refrigeration building or room where rigid splines of wood or other material extend into mating grooves 234 of adjacent panels for connecting the edge portions of the panels. In such installations, the longitudinal edge portions of the insulating panels are subjected to substantial stresses where the panels join together. The cross webs 232 reinforce the edge portions of the panels 230 and permit the panels to withstand substantial lateral forces while also being constructed of a low density foam material.

It is understood that all configurations of core panels which are described herein may have webs comprised of flexible material which is porous and impregnated with adhesive or resin and that alternately they may have webs which are fibrous, porous and unimpregnated. It is also understood that all configurations of core panels may have beveled foam corner recesses 73 at the edges of all webs to provide for fillet connections to intersecting webs or to sandwich panel skins, and that all webs may protrude from core panel faces as will be described later.

Figure 2:
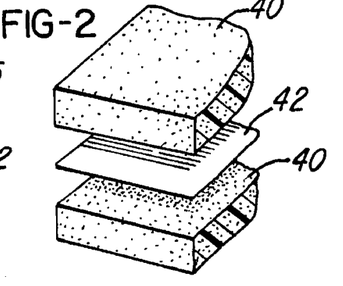
FIG. 2 is an enlarged and exploded perspective view of a corner portion of the composite billet shown in FIG. 1.
Figure 26:
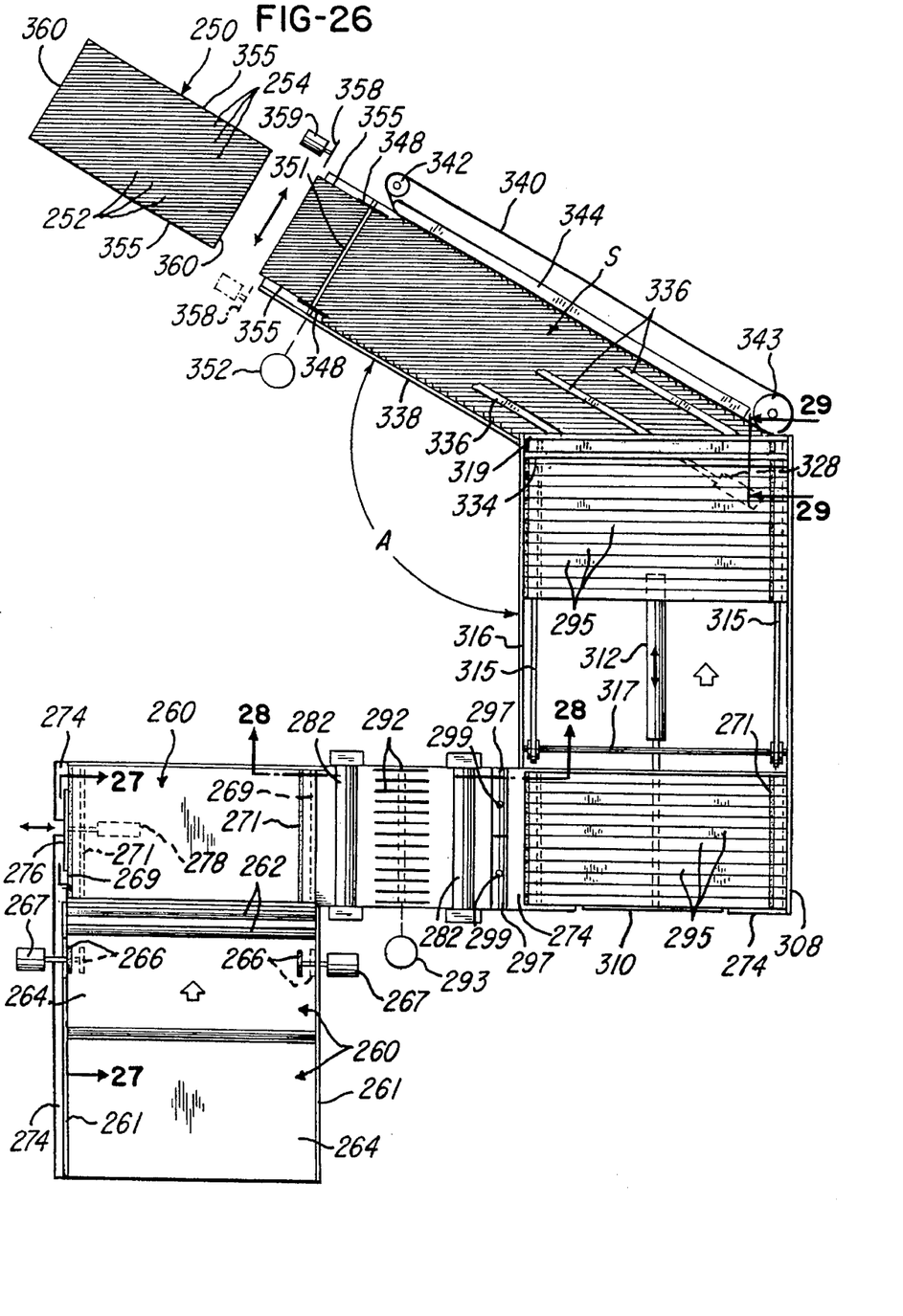
FIG. 26 is a plan view of a machine for producing reinforced foam core panels or billets in accordance with a modification of the invention.

FIG. 26 illustrates somewhat diagrammatically the plan view of a machine for the continuous production of a rectangular reinforced core panel or billet 250 which may have a thickness, for example, from 2 inches to 4 feet, a width of 4 feet and a length of 8 feet or longer. When the panel 250 is intended to be cut or sliced parallel to the parallel faces of the panel, the panel is usually referred to herein as a billet. The rectangular panel 250 is constructed similar to the reinforced core panel 35 described above in connection with FIGS. 1 and 2 and includes a plurality of strips or boards 252 of rigid plastics foam material, and the boards 252 are separated by the interleaving sheets or strips or webs 254 of flexible fibrous material such as the fiberglass mats impregnated with a resin and described above in reference to the sheets 42 of web material.

As apparent in FIG. 26, the strips or boards 252 and sheets or webs 254 extend diagonally of the panel 250 so that all of the ends of the webs 254 are exposed along all four edge surfaces of the panel. This exposure of the webs 254 along the longitudinal edge surfaces of the panel as well as the lateral edge surfaces of the panel provide for high edge strength in order to obtain stronger joints or connections between abutting edge surfaces of adjacent panels. For example, when spline receiving grooves 234 (FIG. 24) are formed within the longitudinal edge surfaces of the panel 250 for receiving a connecting spline, the end portions of the webs also receive the grooves and extend around the spline to provide for a substantially stronger connection between the panel and the spline.

Figure 27:
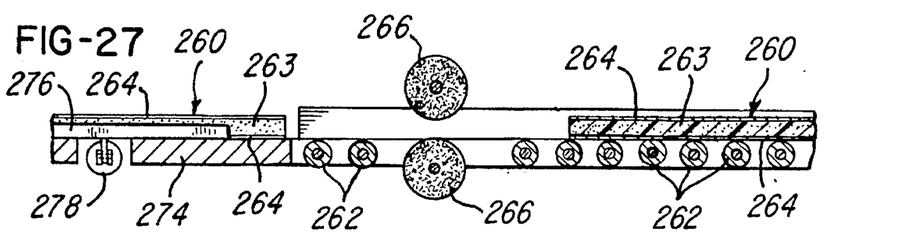
FIG. 27 is a fragmentary section taken generally on the lines 27—27 of FIG. 26.

The machine shown in FIG. 26 is capable of successively producing the panels 250 according to a desired thickness. To produce each panel 250, roof insulation boards 260 or other foam boards with sheets or webs preapplied to one or both surfaces are successively fed into the machine between parallel guide rails 261 which project upwardly from a horizontal platform or table formed by parallel spaced rollers 262 (FIG. 27). As mentioned above, each of the boards 260 may be a rigid roof insulation board or panel 263 consisting of a closed cell polyisocyanurate foam core bonded on each side or face during the foaming process to fiberglass mats or reinforced cellulosic felt facer sheets 264, for example, such as those manufactured by NRG Barriers, Inc. mentioned above.

The panels 260 are successively fed between the rails 261 on the rollers 263 and between upper and lower pairs of grinding wheels 266 (FIGS. 26 and 27) driven by corresponding electric motors 267. The wheels 266 are positioned to remove strips of the facer sheets 264 on the top and bottom of each panel or board 260 at opposite ends of the board to expose corresponding bands 269 and 271 of the rigid foam board 263, for reasons which will be explained later.

Figure 28:
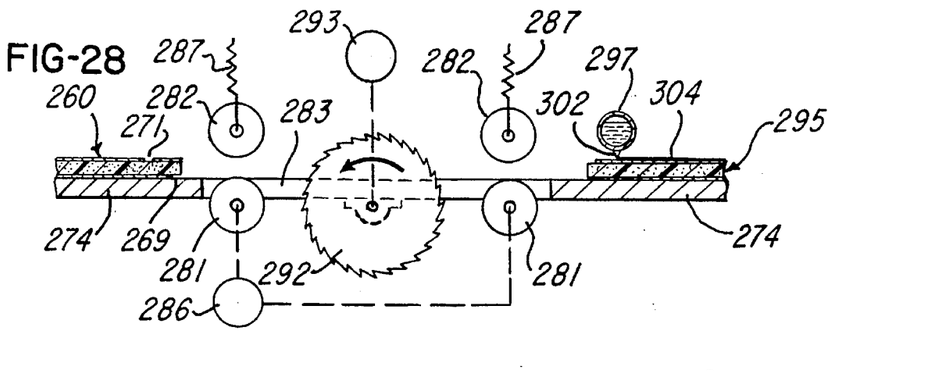
FIG. 28 is a fragmentary section taken generally on the line 28—28 of FIG. 26.

After each board 260 passes between the opposing pairs of grinding wheels 266, the board is received on a table or platform 274 (FIG. 27) which supports a pusher bar 276 actuated by a fluid or air cylinder 278. When the piston rod of the cylinder 278 is retracted, the panel 260 is moved longitudinally on the table 274 by the pusher bar 276 until the end of the board 260 is picked up by a pair of feed rolls 281 and 282 (FIG. 28) positioned within an opening 283 in the table 274. The lower roll 281 is driven by an electric motor drive unit 286, and the upper roll 282 is urged downwardly against the top of the board 260 with a predetermined force by a set of springs 287. The rolls 281 and 282 feed the board 260 longitudinally through a set of gang saws 292 which are driven by a motor 293. The saws 292 cut the board 260 into smaller boards or strips 295 which are then fed by another set of feed rolls 281 and 282 onto an extension of the table 274.

A pair of axially aligned tubular manifolds 297 (FIGS. 26 and 28) are positioned above the table 274 and are supplied with a suitable urethane foam adhesive which is pumped to the manifolds through supply lines 299 (FIG. 26). The bottom portion of the manifolds 297 support a pair of axially spaced nozzles 302 for each of the strips or boards 295 and are effective to apply a pair of parallel spaced and longitudinally extending beads 304 of adhesive along the entire length of each board 295. While not shown in FIG. 26, the next successive batch of boards 295 being fed by the feed rolls 281 and 282 push the preceding batch or set of boards 295 to the position shown in FIG. 26 where the forward ends of the boards 295 are stopped by a guide rail 308. For purpose of avoiding excessive lines, the adhesive beads 304 on the top facet sheets or strips of the boards 295 are not shown in FIG. 26.

A pusher bar 310 (FIG. 26) is connected to the piston rod of a fluid or air cylinder 312 and is positioned on the table extension 274. When the cylinder 312 is actuated to retract the piston rod, the bar 310 pushes the cut set of boards 295 laterally onto a pair of endless conveyor belts 315 and between the guide rail 308 and a parallel guide rail 316. The belts 315 are directed around a set of pulleys mounted on a pair of cross-shafts 317. The belts 315 are driven continuously to move the boards 295 laterally by sliding friction and against a cross stop rail 319 (FIG. 29) positioned above a supporting platform or table 21 having an upper surface flush with the upper runs of the belts 315.

Figure 29:
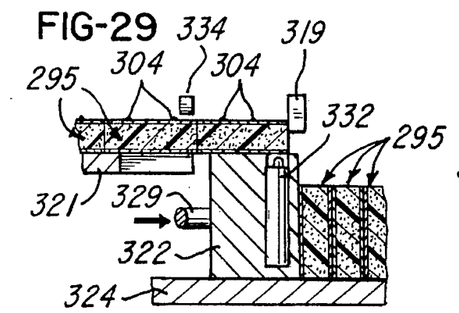
FIG. 29 is a fragmentary section taken generally on the line 29—29 of FIG. 26.
Figure 30:
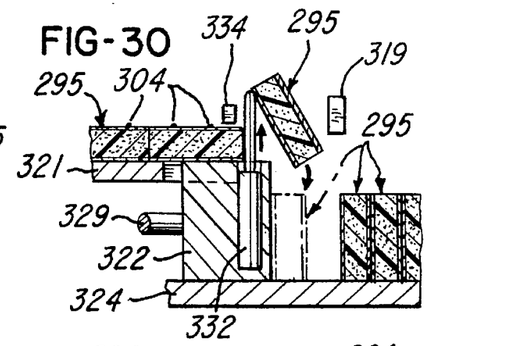
FIG. 30 is a fragmentary section similar to FIG. 29 and showing the rotation of a foam board for producing a continuous stack.

As shown in FIGS. 29 and 30, an elongated pressure member or ram 322 is supported at the end of the table 321 by a platform or table 324 and is guided for reciprocating movement in a linear direction which forms an acute angle with the path of the boards 295 on the conveyor belts 315. The upper surface of the ram 322 is flush with the upper surface of the table 321, and a fluid or air cylinder 328 (FIG. 26) has a piston rod 329 (FIG. 29) for reciprocating the ram 322 between an extended position (FIG. 29) and a retracted position (FIG. 30). When the ram 322 is retracted, a pair of air cylinders 332 within the ram 322 are actuated to extend their piston rods upwardly for flipping or rotating the board 295 supported by the ram 322 through an angle of 90° so that the board drops downwardly onto the table 324 in front of the ram 322, as shown in FIG. 30. A cross rail 334 (FIG. 29) prevents the next successive or adjacent board 295 from elevating with the preceding board 295 when the cylinders 332 are actuated. When the ram 322 is extended (FIG. 29) the board 295 which has been dropped in front of the ram, is pressed by the ram against the preceding board 295 for continuously producing a stack S of the boards 295 while the stack is supported by the table 324 and the adhesive beads 304 cure to connect the boards.

Figure 31:
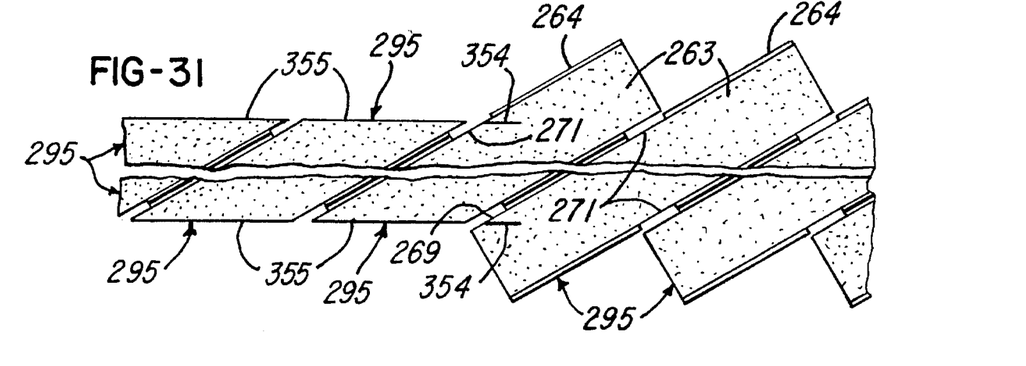
FIG. 31 is a plan view of opposite longitudinal edge portions of a core panel as trimmed on the machine shown in FIG. 26 and with the longitudinal center portion broken away.

As also shown in FIG. 26, the stack S of boards 295 are confined under rails 336 and between a rail 338 and an endless belt 340. The belt 340 extends around a set of rollers 342 and 343 and along a backup rail 344, and preferably, the belt 340 is formed by an endless belt which moves with the boards 295 and slides along the rail 344 to reduce friction between the boards and the rail 344. The parallel rails 338 and 334 form a predetermined angle A with the parallel rails 308 and 316. For example, the angle A may be on the order of 120° so that the boards 295 forming the continuous stack S extend transversely or at a biased angle relative to the direction of movement of the stack S as the boards 295 are compressed together and advanced in a step by step manner when the ram 322 is extended. Referring to FIGS. 26 and 31, a pair of edge trim saws 348 are supported by a cross shaft 351 driven by an electric motor 352 or by separate motors and are positioned to cut the boards 295 forming the stack S along parallel spaced lines 354 (FIG. 31) for removing the stepped-like end portions of the boards 295 and provide the advancing continuous stack S of boards 295 with smooth parallel longitudinal edge surfaces 355. If the boards or panels 260 with preattached sheets 264 of web material are produced with inclined end surfaces, the edge trim saws 348 may be omitted.

A traveling cut off saw 358 is driven by a motor 359 and is supported by a track (not shown) for lateral movement across the stack S of boards 295. The saw 358 cuts the advancing stack S of boards at longitudinally spaced intervals for successively producing the reinforced foam core board or panels 250 and to provide the boards with smooth parallel end surfaces 360. As a result of the production apparatus or machine shown in FIG. 26, all of the parallel spaced webs 254 of each foam panel or billet 250 extend at an angle of about 30° with respect to the longitudinal edge surfaces 355 so that the ends of the webs are not only exposed at opposite end surfaces 360 of the panel or billet 250 but are also exposed along the longitudinal edge surfaces 355 of the panel or billet. If the billet 250 is cut along planes parallel to the surfaces 355 or 360, the resulting panels have webs inclined relative to the faces of the panels.

As shown in FIG. 31, as a result of the removal of strips or bands 269 and 271 of the facer sheets 264 on each panel 260, the ends of the webs 254 are recessed inwardly from the longitudinal edge surfaces 355 of the panel 250 as determined by the saw cuts 354. Thus either before or after the panel is laminated to parallel spaced skins, the edge surfaces 355 may be precisely machined without the cutting tools contacting and fraying the webs 254 to obtain precision butt joints between the longitudinal edge surfaces of adjacent panels 250 when the panels are assembled together.

Reinforced core panels with improved structural properties and having two crossing sets of parallel webs extending at acute angles with respect to the longitudinal edge surfaces of the panel may be formed by substituting for the composite boards 260 previously formed panels 250 with overlying web sheets 42. The core panels will then have diamond- or parallelogram-shaped cells between the webs.

FIG. 32 illustrates a modified reinforced foam core panel 370 which is constructed similar to the core panel 35 except that the parallel spaced porous fibrous webs 372 each has opposite edge portions 374 which protrude or project beyond the outer surfaces of the foam strips or boards 376 sandwiched between the webs 372. The core panel 370 with the protruding web edge portions 374 may be constructed in a manner as described above in connection with the core panel 85 shown in FIG. 16, that is, by removing outer portions of the foam boards 376 to form recesses 378 between the edge portions 374 of the porous webs 372.

The core panel 370 may also be produced by feeding a continuous strip of the flexible porous web material from a supply roll onto a continuously formed or expanded foam roof board having a width somewhat less than the width of the strip of web material. For example, a continuous strip of flexible and porous fibrous web material may be attached by pressure sensitive adhesive to one of the fiberglass facer sheets on a continuously formed strip of roof board. The continuous roof board with the attached web strip are then cut at longitudinally spaced intervals and stacked to form the core panel 370, for example, with pressure sensitive adhesive attaching the web strips and foam boards together. Before bonding the foam boards and web strips together, the boards may be machined to form resin distribution grooves and/or fillet recesses.

As shown in FIG. 33, when a core panel 370 is sandwiched or pressed between opposite fiberglass skins 375 to form a composite panel 380, the fibers forming the projecting edge portion 374 flare outwardly to increase the bonding area between each web 372 and each skin 375. Preferably, the resin is injected or distributed into the fiberglass skins 375 by a vacuum or differential pressure process so that the resin not only penetrates between the fibers within the skins but also between the fibers forming the porous webs 372. As a result, the webs 372 form integral and positive tie webs connecting the skins 375 after the resin cures.

Figures 34, 35:
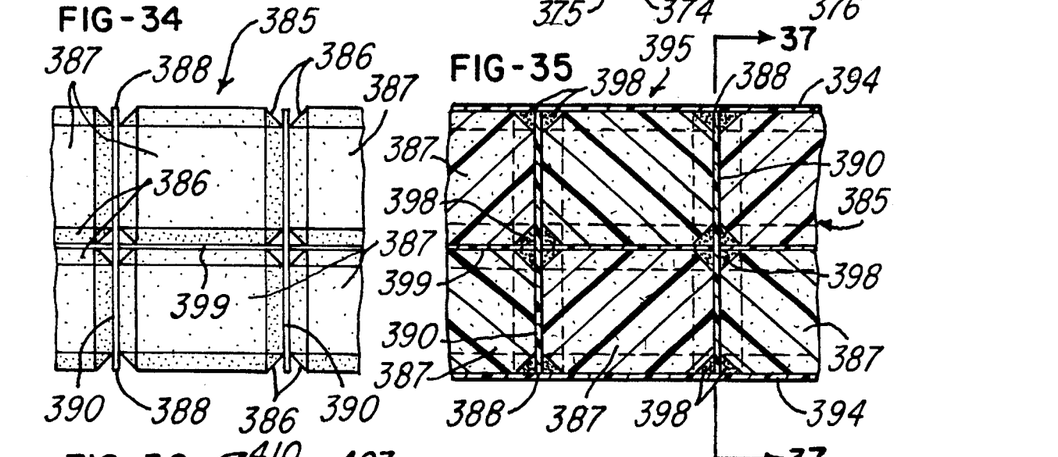
FIG. 34 is a fragmentary edge view of another reinforced foam core panel constructed in accordance with the invention.
FIG. 35 is a fragmentary section of the core panel shown in FIG. 34.

Referring to FIGS. 34 and 35, a reinforced foam core panel 385 is constructed by cutting the panel from a billet 90 as described above in connection with FIG. 5. The panel 385 includes beveled corner fillet grooves or recesses 386 within the foam boards 387 in all three X-Y-Z directions. The recesses 386 expose the edge portions 388 of all of the porous flexible fiberglass webs 390 along the X-Y grid pattern on each side or face of the core panel 385 and also expose the edge portions of the interrupted webs within the core panel. Thus some of the recesses 386 extend through the panel 385 at the intersections of the continuous and interrupted webs 390. The edge portions 388 of all webs 390 may also protrude from the faces of the foam boards at all intersections of webs and all intersections of webs with skins.

When the core panel 385 is sandwiched between composite or fiberglass skins 394 (FIG. 35) to form a composite reinforced panel 395, the resin which is sucked between the fibers within the skins 394 by vacuum is also sucked through the recesses 386 and between the fibers within the fiberglass webs 390. As a result, the resin within the recesses 386 forms fillets 398 which positively connect the web edge portions 388 to the skins 394. The fillets 398 also connect the support webs 399 extending within the foam boards parallel to the skins 394 to the primary webs 390 which tie the skins together. The support webs 399 cooperate with the rigid foam to prevent buckling of the primary support or tie webs 390. Although only one intermediate web 399 is shown in FIG. 35, one or more intermediate webs may be used with any of the core panels described herein, and may be pre-impregnated or porous and may also be orientated at an acute angle to the skins of the panel.

It is also apparent that the X-Y grid of fillet recesses 386 within each face of the core panel 385 and the fillet recesses extending throughout the core panel, serve as resin distribution passages or channels for assuring that the resin fills all of the porous webs 390 and the fillet recesses 386. Prior to attaching webs 390, web fillet recesses and/or resin distribution grooves may also be formed in the core panels by machining into the foam boards grooves which will later be split by the gang saws. Protruding webs may be formed by saw blades adjacent the gang saw blades but sufficiently smaller to miss the facer sheets but rabbet the foam to the width of the desired protrusion.

Figures 36, 37:
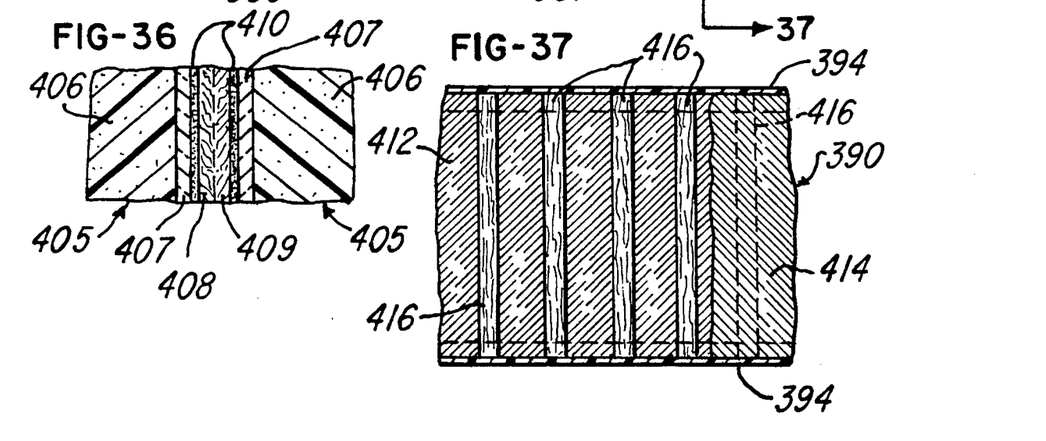
FIG. 36 is a greatly enlarged fragmentary section of a web portion of a reinforced foam core panel constructed similar to the panel shown in either FIG. 33 or FIG. 35.
FIG. 37 is a fragmentary section taken generally on the line 37—37 of FIG. 35.

A greatly enlarged fragmentary section of a modified reinforced foam core panel constructed in accordance with the invention, is shown in FIG. 36. In this modification, adjacent expanded foam roof boards 405 are constructed as described above in connection with the panels 35 and 85 and include foam boards 406 with attached fiberglass facet sheets 407. A dry, porous fibrous web material includes adjacent layers 408 and 409 sandwiched between the facet sheets 407 and attached by layers 410 of pressure sensitive adhesive. The layers 408 and 409 of web material are stitched together, and each layer has parallel linear fibers extending at 45 degrees with respect to the side surfaces or skins of the panel 405. The layer 408 of fibers extend at 45 degrees in one direction, and the adjacent layer 409 of fibers extend at 45 degrees in the opposite direction. Thus the fibers in one layer extend at 90 degrees with respect to the fibers in the adjacent layer.

FIG. 37 illustrates the construction of a web 390 within the core panel 395 described above in connection with FIG. 35. Each porous and flexible fibrous web 390 includes a layer 412 of parallel linear fibers which extend at an angle of 45 degrees in one direction relative to the skins 394 and a layer 414 of parallel linear fibers which extend at an angle of 45 degrees in the opposite direction with respect to the skins 394. The layers 412 and 414 are separated by parallel spaced bundles 416 of linear fibers which extend at right angles or normal to the skins 394 and define therebetween resin distribution channels. The fiber layers 412 and 414 and bundles 416 of fibers are stitched together to form a porous web which is attached to the adjacent foam boards, preferably by pressure sensitive adhesive. Thus when resin is pumped or sucked into the pores or voids between the glass fibers within the skins 394, the resin also flows within the pores or voids between the fibers within the webs and the passages between the bundles of fibers so that each web 390 is fully impregnated with resin and forms an integral and positive tie web connection between the skins 394. The spacer bundles may also be oriented parallel or at an acute angle to the skins depending on the desired direction of resin flow.

In lieu of spaced bundles, the fibrous reinforcement layers may be separated by random mat, scrim, or other fibrous material having crossing layers of fibers with interconnected interstices conducive to relatively free flow of resin through the plane of the web. Resin flow through the webs may also be improved by leaving gaps in the fibers of the primary stitched reinforcement layers which comprise the webs, rather than by separating the primary layers by spaced bundles as described above.

Since the bending loads in a sandwich panel, such as the panel 395, result in shear forces in the core panel 385, and the forces are generally oriented at 45 degrees relative to the panel skins, the webs 390 effectively resist the shear within the core. That is, the plus and minus 45 degree orientation of the glass fibers within the layers 408 and 409 greatly increase the structural and cost efficiency of the reinforcing webs 390.

While the forms of reinforced foam panels and billets herein described and their method and apparatus of construction constitute preferred embodiments of the invention, it is to be understood that the invention is not limited to these precise forms, method steps and apparatus, and that changes may be made therein without departing from the scope and spirit of the invention as defined in the appended claims.

The invention having thus been described, the following is claimed:

1. A reinforced foam core panel adapted for use between generally parallel skins, comprising a plurality of boards of rigid plastics foam material with each board having opposite faces, a strip of porous and fibrous flexible web material overlying at least one of said faces of each said board, said boards of foam material arranged in a stack with said strips of web material disposed between said boards, means for connecting said boards of rigid foam material and said strips of porous and flexible fibrous web material together while maintaining substantial porosity throughout said strips of web material to form a core panel with said boards having opposite side surfaces and with said strips of web material having edge portions extending to said opposite side surfaces, said side surfaces of said boards being exposed for receiving an adhesive resin for attaching the skins to said side surfaces and to said edge portions of said strips of web material, the porosity of said strips of web material providing for the flow of resin through said strips to form integral tie webs connecting the skins, said boards of foam material defining fillet recesses within said side surfaces adjacent said edge portions of said strips of web material, and said recesses are adapted to receive the resin for increasing the bond of said strips to said skins.

2. A reinforced foam core panel as defined in claim 1 wherein each of said boards of foam material includes flexible facer sheets bonded to said opposite faces, said foam material is expanded between said facer sheets, and said strips of porous and fibrous web material are disposed between said facer sheets.

3. A reinforced foam core panel as defined in claim 1 wherein each said strip of web material includes adjacent layers of generally parallel linear fibers, and said fibers forming one said layer extend at an angle of about 45 degrees relative to said side surfaces and cross said fibers forming the adjacent said layer, and said fibers in said adjacent layer extend at an angle of about 45 degrees relative to said side surfaces in the opposite direction.

4. A reinforced foam core panel as defined in claim 3 and including groups of spacer fibers separating said layers of linear fibers and defining passages between said spacer fibers for distributing resin.

5. A reinforced foam core panel as defined in claim 1 where in said edge portions of said strips of web material protrude outwardly from said side surfaces of said boards and are adapted to flare out against said side surfaces in response to attachment pressure of the skins.

6. A reinforced foam core panel as defined in claim 1 where in said core panel includes intersecting said strips of web material all having said edge portions extending to said opposite side surfaces of said boards, and all of said strips of web material provide for receiving the resin to form a grid-like pattern of said tie webs.

7. A reinforced foam core panel as defined in claim 6 and including intermediate strips of said porous and fibrous flexible web material extending within said core panel generally parallel to said opposite side surfaces of said boards and intersecting said tie webs to form a box-like pattern of intersecting said webs.

8. A reinforced foam core panel as defined in claim 7 wherein said boards of foam material define fillet recesses adjacent said edge portions of said strips and extending through said panel at said intersections of said strips.

9. A reinforced foam core panel as defined in claim 6 wherein said boards of foam material define fillet recesses within said side surfaces adjacent said edge portions of said intersecting strips of web material and through said panel at said intersections, and said recesses provide for receiving the resin to increase the bond of said strips to the skins.

10. A reinforced core panel having opposite side surfaces adapted to be attached to corresponding skins, comprising a plurality of pieces of rigid plastics foam material arranged to form a panel and with adjacent pieces having opposing faces, a plurality of strips of porous and fibrous flexible web material extending between and separating said opposing faces of said adjacent pieces, means for holding the adjacent said pieces and said strips together while maintaining substantial porosity throughout said strips to form a core panel with said pieces and edge portions of said strips of web material forming said opposite side surfaces of said core panel, said pieces and said edge portions of said strips of web material being exposed for receiving a curable adhesive resin for attaching the skins to said pieces and to said edge portions of said strips of web material, the porosity of said strips of web material providing for the flow of resin through said strips to form integral tie webs connecting the skins, said pieces defining fillet recesses adjacent said edge portions of said strips of web material, and said recesses are adapted to receive the resin for increasing the bond strength of said strips to the skins.

11. A reinforced foam core panel assembly having opposite sides formed by corresponding rigid skins, comprising a plurality of pieces of rigid plastics foam material arranged to form a panel, each said piece having opposite side surfaces adjacent said skins and with adjacent pieces having opposing faces, a plurality of thin webs of porous and fibrous flexible material disposed between and separating said opposing faces of said adjacent pieces, each of said webs having opposite edge portions terminating adjacent said skins and said opposite side surfaces of said pieces, means attaching the adjacent said pieces and said webs together while maintaining substantial porosity throughout said webs to form a core panel with said pieces and said edge portions of said webs forming opposite sides of said core panel, a curable adhesive resin attaching said skins to said pieces of foam material and to said edge portions of said webs, and said resin extends throughout said porous webs and impregnates said webs to bond the fibers of said edge portions to said skins and to form separate integral tie webs connecting said skins.

12. A reinforced foam core panel assembly as defined in claim 11 wherein said pieces of foam material define fillet recesses adjacent said skins and said edge portions of said webs, and said recesses receive said resin for increasing the bond strength of said webs to said skins.

13. A reinforced foam core panel assembly as defined in claim 11 wherein said edge portions of said webs protrude outwardly from said side surfaces of said pieces of foam material and flare laterally outwardly against said skins.

14. A reinforced foam core panel assembly as defined in claim 11 wherein said core panel includes intersecting said webs all having said edge portions extending to said opposite side surfaces of said pieces, and all said webs receive said resin to form a grid-like pattern of intersecting said tie webs.

15. A reinforced foam core panel assembly as defined in claim 14 and including intermediate said porous and fibrous flexible webs extending within said core panel generally parallel to said opposite side surfaces of said pieces and intersecting said the webs to form a box-like pattern of intersecting said webs.

16. A reinforced foam core panel assembly as defined in claim 15 wherein said pieces of foam material define fillet recesses adjacent said edge portions of said intersecting webs and extending through said panel at said intersections of said webs, and said recesses receive said resin to increase the bond of said webs to said skins and said intersecting webs.

17. A reinforced foam core panel assembly as defined in claim 14 wherein said pieces of foam material define fillet recesses within said side surfaces adjacent said edge portions of said webs and through said panel at said intersections, and said recesses receive said resin to increase the bond of said webs to said skins and to enhance the strength of said tie webs.

18. A reinforced foam core panel assembly as defined in claim 11 wherein said core panel is generally rectangular and has two pairs of opposite generally parallel edge surfaces, and said webs extend transversely at acute angles with respect to both pairs of said edge surfaces of said panel and intersect all of said edge surfaces.

19. A reinforced foam core panel assembly as defined in claim 18 wherein said pieces of foam material define fillet recesses within said side surfaces adjacent said edge portions of said webs, and said recesses receive said resin for increasing the bond of said webs to said skins.

20. A reinforced foam core panel assembly as defined in claim 11 and including a plurality of said core panels in stacked relation with said weds of each core panel extending transversely across said webs of the adjacent said core panel, and a sheet of porous and fibrous flexible material extending between adjacent said core panels.

21. A reinforced foam core panel assembly as defined in claim 11 wherein sale core panel includes secondary said webs extending parallel to said side surfaces and intersecting said tie webs for supporting said tie webs against buckling.

22. A reinforced foam core panel assembly as defined in claim 11 wherein said core panel includes an outer layer of foam material with a density higher than the density of an adjacent inner layer of foam material.

23. A reinforced foam core panel assembly as defined in claim 11 wherein adjacent said webs converge within said core panel in lateral cross-section and have alternately adjacent said edge portions.

24. A reinforced foam core panel assembly as defined in claim 11 wherein said webs cross within said core panel between said opposite sides and form webs having an X-shape cross-sectional configuration.

* * * * *